(No Model.)

G. HOPF.
VENT FOR BEER BARRELS.

No. 281,694. Patented July 24, 1883.

WITNESSES:
Adam Geo. White
Louis Nolting.

INVENTOR
George Hopf
BY Wm H Lotz
ATTORNEY

UNITED STATES PATENT OFFICE.

GEORGE HOPF, OF CHICAGO, ILLINOIS.

VENT FOR BEER-BARRELS.

SPECIFICATION forming part of Letters Patent No. 281,694, dated July 24, 1883.

Application filed June 6, 1883. (No model.)

*To all whom it may concern:*

Be it known that I, GEORGE HOPF, a citizen of the United States of America, residing at Chicago, in the county of Cook and State of Illinois, have invented certain new and useful Improvements in Vents for Beer-Barrels, of which the following is a specification, reference being had therein to the accompanying drawings.

This invention relates to vents adapted to be driven into the upper bung-hole of beer barrels or kegs while on draft, and provided with valves that are arranged to allow air to enter the barrel as the beer is drawn, but to close against the escape of the carbonic-acid gases. These vents, being turned of wood, are often split by driving them with a mallet into the bung-hole of the barrel; and it is my object to produce a simple and cheap device for binding such plugs with metal rings or hoops that will prevent their splitting.

My invention consists in turning creases in the head of the vent, and in tying a wire around each such crease, the ends of which are twisted together to form a tight-fitting solid ring, all as more fully hereinafter described and specifically claimed.

Figure 1:
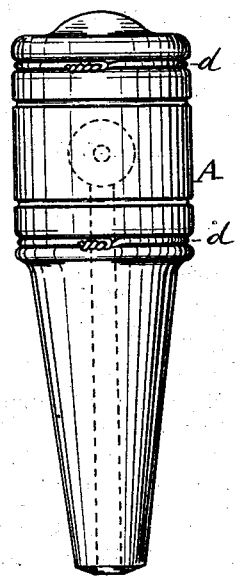
Figure 2:
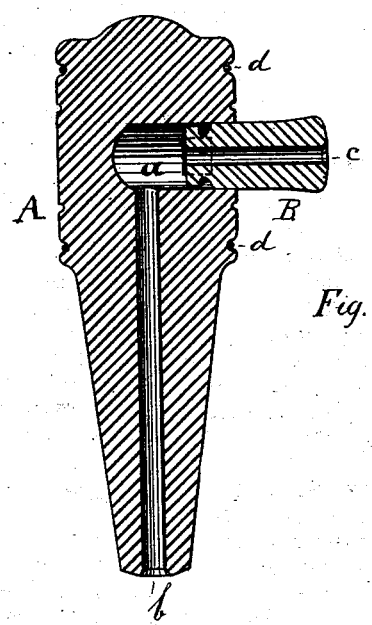
Figure 3:
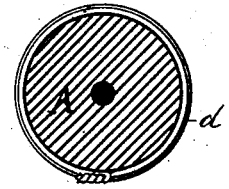
Figure 4:
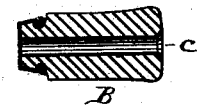

In the accompanying drawings, Figure 1 represents an elevation, and Fig. 2 a vertical cross-section through the center of my improved beer-vent. Fig. 3 is a section through one of the creases of the vent-head, and Fig. 4 a cross-section through the vent-plug.

Corresponding letters in the several figures of the drawings designate like parts.

A denotes the vent, having a cylindrical head and a conical shank. The head of this vent has bored in its side a tapering socket, $a$, for inserting the tapering plug B, and has a hole, $b$, bored axially through its shank, that communicates with socket $a$. The plug B has also bored a hole, $c$, through its axis, and at its small end this plug is flattened on opposite sides for a strip of thin sheet-rubber that is stretched over the end of the plug to cover hole $c$, the ends of which rubber strip being secured by a thread wound over a crease that is turned in the plug. The plug B being driven into its socket to be tight therein, the rubber will allow the passage of air or gases in one direction only.

The head of the vent has a convex end upon which to strike with a mallet for driving it into the bung-hole of a barrel, and to strengthen it and prevent its splitting or cracking, I turn a crease near each end of the head, and around each crease I draw a wire, $d$, the ends of which I couple by twisting them together with a pair of pinchers, so as to form a solid tight ring around such vent-head that is embedded in the crease. The twisted ends I also bend down flat into the crease, so as not to project. As will be readily seen, wire rings thus formed around the head do not add much to the cost of a wooden vent, and yet make it much more durable.

What I claim is—

The wooden beer-barrel vent, substantially as described, and bound with metal rings that are embedded into creases, and are formed each of a piece of wire, the ends of which are tied together by twisting, in the manner described and shown, for the purpose specified.

In testimony whereof I affix my signature in presence of two witnesses.

GEORGE HOPF.

Witnesses:
ADAM GEO. WHITE,
R. G. SCHMID.